C. L. SPENCER.
Treadle-Mechanisms.
No. 153,023.  Patented July 14, 1874.
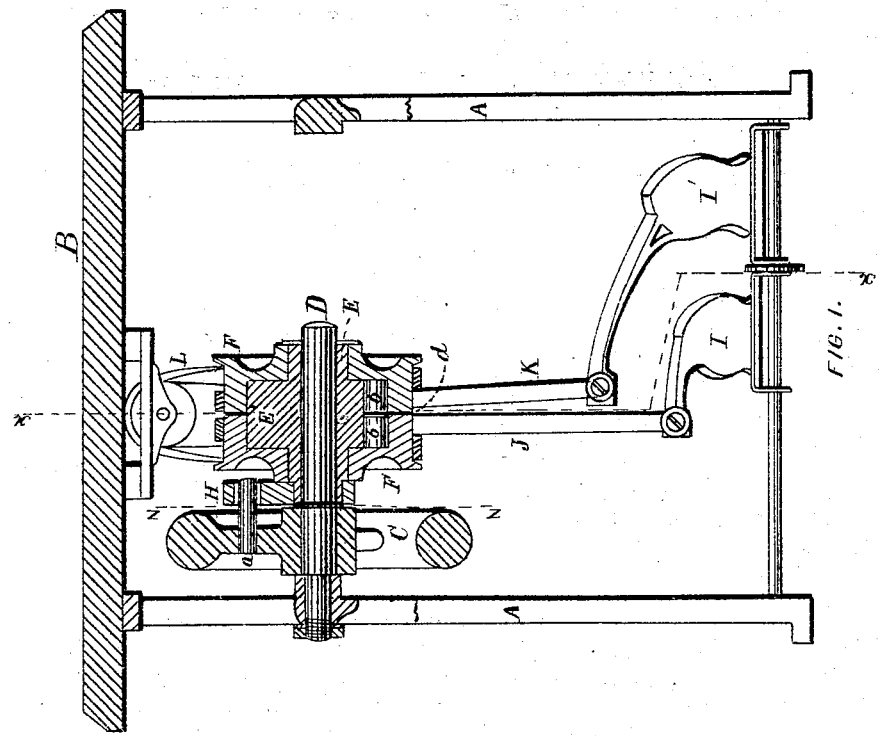
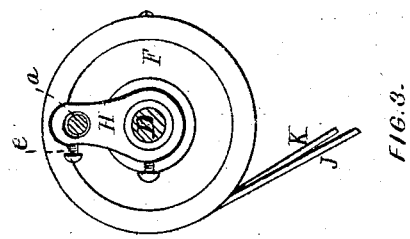
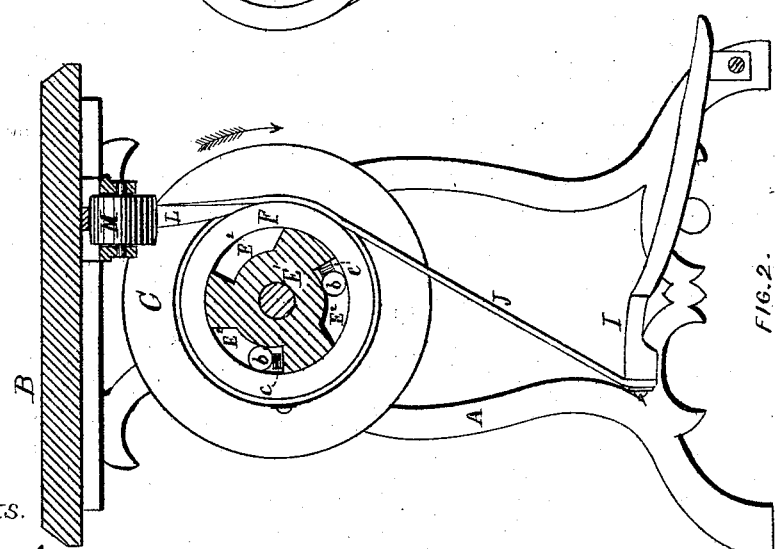
WITNESSES.  
N. C. Lombard  
S. A. Wood
INVENTOR.  
Chas. L. Spencer

UNITED STATES PATENT OFFICE.

CHARLES L. SPENCER, OF PROVIDENCE, RHODE ISLAND.

IMPROVEMENT IN TREADLE MECHANISMS.

Specification forming part of Letters Patent No. 153,023, dated July 14, 1874; application filed May 14, 1873.

*To all whom it may concern:*

Be it known that I, CHARLES L. SPENCER, of Providence, in the county of Providence and State of Rhode Island, have invented a new and useful Improvement in Sewing-Machines, of which the following, taken in connection with the accompanying drawings, is a specification.

My invention relates to the manner of connecting the treadle mechanism to the fly-wheel, and is designed more especially for use in applying the various improved treadle mechanisms to old machines, having the fly-wheel fitted to and revolving upon a fixed stud.

In the alteration of such machines, as heretofore practiced, it has been necessary to remove the fly-wheel from the machine, and either make a new one having a long hub or to bore out the old one and drive into it one end of sleeve upon which the propelling mechanism was mounted, either of which modes of operation required the taking of the fly-wheel to a machine-shop to have the work done, which added materially to the cost, and in many cases it could not be done without sending a long distance, as in many localities where sewing-machines are used there are no machine-shops within fifty miles or more.

To obviate this difficulty and produce a device by means of which the propelling mechanism may be coupled to the fly-wheel without any alteration therein is the object of my invention; and it consists in constructing the propelling mechanism with a sleeve-shaft, upon one end of which is secured the hub of a crank or disk provided with a hole to fit the crank-pin set in the fly-wheel, and mounting said sleeve upon an extension of the stud upon which the fly-wheel revolves.

Instead of the hole in the end of the crank the end of the crank-arm may be forked and embrace the crank-pin set in the fly-wheel, upon either side; and, in order to insure a ready connection without extra fitting, one fork of the crank should be provided with a set-screw, by which the crank may be secured to the pin in the wheel, even if the hole or slot be considerably larger than the pin.

In the drawings, Figure 1 is a longitudinal section of a sewing-machine table with my improvement applied. Fig. 2 is a transverse section on line $x\ x$ on Fig. 1; and Fig. 3 is a transverse section on line $z\ z$ on Fig. 1, looking from the fly-wheel toward the driving mechanism.

A A are the side frames of a sewing-machine, and B is the table. C is the fly-wheel, provided with the pin $a$ and mounted upon the stud D, all of which is constructed in the usual manner, except that the stud D is of greater length. E is a sleeve or quill fitted to revolve on the stud D, and provided with an enlargement, $E^1$, near its middle, in the periphery of which is formed notches or recesses $E^2$ by cutting away the stock, the bottoms of said recesses being slightly eccentric to the axis of said sleeve. Upon either side of said enlargement are mounted loosely upon the sleeve E two pulleys, F, having recesses formed in their contiguous sides to receive the enlargement $E^1$, the rims of said pulleys inclosing it and coming nearly in contact with each other. In the recesses formed between the rims of the pulleys and the enlargement $E^1$, on the sleeve E, are placed small steel cylinders $b$, resting upon small spiral springs, $c$, at the deepest ends of said recesses, as shown, a thin washer, $d$, being placed between the two pulleys to separate the two sets of cylinders $b$. If, now, one of the pulleys F is turned in the direction indicated by the arrow, the cylinders $b$, between the rim of said pulley and the recessed surface in the hub $E^1$ of the sleeve E, will roll toward the higher part of said recess, and, binding between it and the rim of the pulley, will cause the sleeve E to revolve with the pulley, and when the motion of the pulley is reversed the cylinder $b$ rolls into the deeper part of the recess, and allows the pulley to revolve without moving the sleeve. Upon the end of the sleeve E next the fly-wheel C is secured the crank H, the outer end of which embraces the pin $a$, and is secured thereto by the set-screw $e$. Motion is imparted to the pulleys F from the treadles I and I' by means of the straps J, K, and L and the pulley M.

The friction mechanisms mounted upon the sleeve E and the means of imparting motion thereto are no part of my present invention; but my improvement is confined to the mode of coupling said mechanism or its equivalent to the fly-wheel without alteration in said fly-wheel, and it is equally well adapted to any other kind of friction mechanism running upon the same stud with the fly-wheel.

What I claim as new, and desire to secure by Letters Patent of the United States, is—

A mechanism actuated by a treadle or treadles and running on the same stud or shaft as the fly-wheel when said mechanism is connected to the fly-wheel by means of the crank-coupling or clutch H, substantially as described.

Executed at Boston this 12th day of May, 1873.

CHAS. L. SPENCER.

Witnesses:
N. C. LOMBARD,
S. A. WOOD.